United States Patent Office 3,528,902
Patented Sept. 15, 1970

3,528,902
METHOD OF PRODUCING THIN FILMS BY SPUTTERING
Kiyotaka Wasa, Osaka-shi, and Shigeru Hayakawa, Hirakata-shi, Japan, assignors to Matsushita Electric Industrial Co., Ltd., Osaka, Japan
Filed Oct. 3, 1967, Ser. No. 672,516
Claims priority, application Japan, Oct. 4, 1966, 41/65,864, 41/65,865, 41/65,866
Int. Cl. C23c 15/00
U.S. Cl. 204—192                6 Claims

ABSTRACT OF THE DISCLOSURE

An improved method of producing thin films by a cathodic sputtering process in a sputtering apparatus, capable of efficiently making homogeneous, thin films, said sputtering apparatus is of a coaxial cylinder type and comprises a pair of cylindrical electrodes, an outer cylindrical electrode, and an inner cylindrical electrode surrounded at least partially by said outer cylindrical electrode. One of said pair of cylindrical electrodes is a cathode provided with a smooth surface layer of material to be deposited. The other of said pair of cylindrical electrodes is an anode adapted to have substrates secured to it. Said sputtering apparatus further comprises voltage supplying means for forming a discharge between said pair of cylindrical electrodes, and means for creating a transverse magnetic field, the magnetic flux density of which is higher than 1,000 gauss.

BACKGROUND OF THE INVENTION

Field of the invention

The present invention relates to improved methods and an improved apparatus for producing thin films by cathodic sputtering. More particularly, it relates to a method of producing thin films by using a sputtering apparatus wherein electrodes and an associated magnetic field means are arranged so as to increase the speed of production of thin films, especially at very low pressures, and to provide a closer control over the production processes for such thin films.

Description of the prior art

Recently, increasing interest has been paid to cathodic sputtering processes for making thin films, adapted for micro-miniaturized circuitry. This is due to the fact that a so-called "reactive sputtering" process can be used to prepare various kinds of thin films for use in conductors, resistors and even in capacitors.

The conventional cathodic sputtering apparatus comprises a two-electrode glow discharge system having a planar cathode and anode. The cathode, which is made of the material to be deposited, i.e., the deposit material, is sputtered by means of an electrical glow discharge in an atmosphere of gas at a pressure of from 1 to $10^{-2}$ torr. The sputtered cathode material is deposited on a substrate to form a film. However, this process of using the sputtering apparatus has several drawbacks such as a low deposition speed, i.e. a low speed of producing the thin films on the substrate, contamination of the films produced and difficulties in controlling the thickness, composition and evenness of said thin films. Therefore, at present, such a cathodic sputtering process is not widely used for manufacturing thin films. There have been extensive attempts to improve the cathodic sputtering apparatus by workers in this art. Penning disclosed an improved cathodic sputtering apparatus utilizing a magnetic field in U.S. Pat. No. 2,146,025 (Feb. 7, 1939). Recently, Kay has also disclosed a cathodic sputtering apparatus which resembles the cathodic sputtering apparatus reported by Penning in the Japanese Pat. No. 39–50,014 (July 27, 1966).

In the sputtering apparatus developed by Penning, the electrodes are constructed in such a way that the magnetic lines of force cross the electric lines of force in at least one portion of the discharge space, not only during discharge but also during initiation, at an angle greater than 45°, preferably 90°. He has also suggested a few possible electrode configurations and various arrangements of the magnetic coil which produces the magnetic field.

Penning's system has a coaxial cylindrical geometry. The apparatus is in principle the same as that of the well-known manometer developed by him for the measurement of low gas pressure.

He claims that the magnetic field is so chosen that during discharge the electrons are prevented from reaching the anode directly along the electric lines of force so that they traverse a materially longer path than in the absence of the magnetic field.

He states that a magnetic field of several hundred gauss makes it possible to reduce the working pressure of the sputtering apparatus and to increase the speed of producing the thin films.

The conventional cathodic sputtering apparatus which has been developed by Kay also has a coaxial cylindrical geometry with an axial magnetic field and is not essentially different in its construction and operation from the apparatus of Kay, except for the fact that in Penning's apparatus, the inner cylindrical electrode is used as a cathode, while in Kay's apparatus the outer cylindrical electrode is used as the cathode.

The present invention provides radical improvements in the method of producing thin films by using the cathodic sputtering apparatus proposed by Penning and offers a novel method of producing thin films which has many advantages over conventional method of using thin films. Those skilled in the art will recognize that this novel method is indispensable to the manufacturing of thin films, especially dielectric films consisting of metal oxides.

SUMMARY OF THE INVENTION

It is an object of the present invention to provide a novel method of producing thin films by using a cathodic sputtering apparatus which overcomes the aforesaid drawbacks of the conventional methods of producing thin films by using cathodic sputtering apparatuses.

Another object of the present invention is to provide an improved method of producing thin films with a high rate of film growth by using a cathodic sputtering apparatus.

A further object of the present invention is to provide an improved method of producing homogeneous thin films by using a cathodic sputtering apparatus.

A still further object of the present invention is to provide an improved method of producing thin dielectric films by using a cathodic sputtering apparatus.

These objectives are accomplished by the of the present invention by using a sputtering apparatus of the coaxial cylinder type. Said sputtering apparatus comprises a pair of cylindrical electrodes, an outer cylindrical electrode, and an inner cylindrical electrode surrounded at least partially by said outer cylindrical electrode. One of said pair of cylindrical electrodes is a cathode provided with a smooth surface layer of material to be deposited. The other of said pair of cylindrical electrodes in an anode adapted to have substrates secured to it. Said sputtering apparatus further comprises voltage supplying means for forming a discharge between said pair of cylindrical electrodes, and means for creating a transverse magnetic field the magnetic flux density of which is higher than 1,000 gauss.

BRIEF DESCRIPTION OF THE DRAWINGS

Further features and advantages of the present invention will be apparent upon a consideration of the following description and the accompanying drawings wherein.

DESCRIPTION OF THE PREFERRED EMBODIMENT

Figure 1:
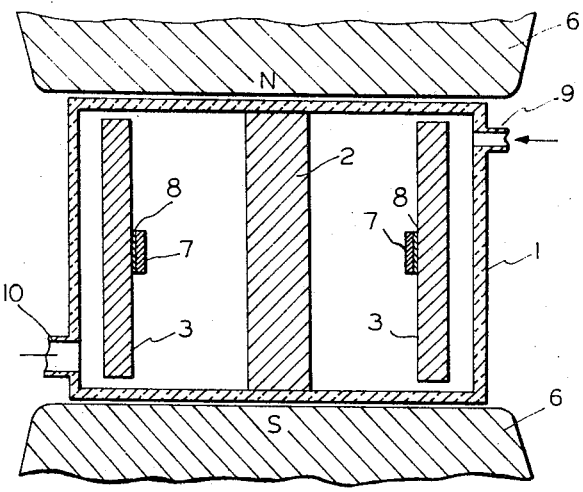
FIG. 1 is a diagrammatic, longitudinal, sectional view of the sputtering apparatus which is used in the method of producing thin films in accordance with the present invention.
Figure 2:
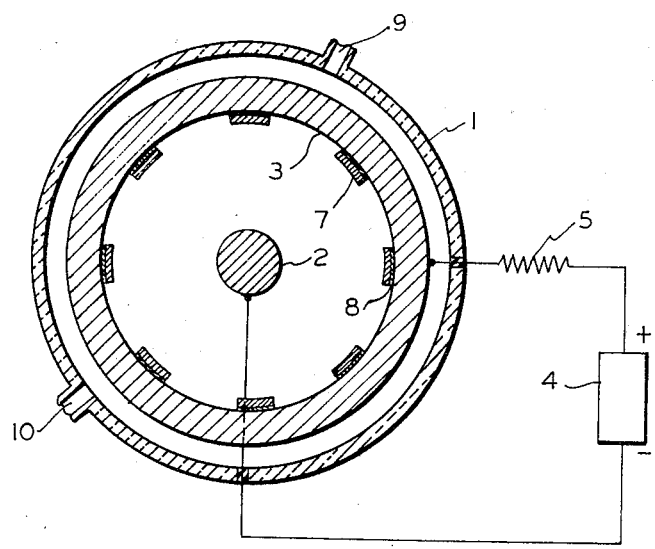
FIG. 2 is a cross sectional view of the sputtering apparatus of FIG. 1.

Referring to FIGS. 1 and 2, a pair of cylindrical electrodes 2 and 3 are mounted within a cylindrical envelope 1 having an inlet 9 and an outlet 10. Said electrodes are connected to a voltage supply source 4. It is important that the leads by which said electrodes 2 and 3 are connected to the voltage supply source pass through said envelope 1 through a gas-tight seal. Either of said cylindrical electrodes can be a cathode but preferably said inner electrode is the cathode as indicated in FIGS. 1 and 2. Substrates 7 to be coated are secured to an anode. Said substrates 7 can be positioned in a hollow formed on the surface of said anode 3, or secured by any conventional holding means. Said cylindrical envelope 1, containing an ionizable medium, can be made of any gas-tight, non-magnetic material.

Said cylindrical envelope 1, containing said pair of electrodes, is placed in a magnetic field parallel to the sides of said cylindrical electrodes 2 and 3 so that said field is transverse to the discharge from said electrodes. Said field can be supplied by any available magnetic field creating means 6, such as an electro-magnet externally attached across the flat end surfaces of said cylindrical envelope 1.

Said ionizable medium comprises an inert gas such as argon or a reactive gas such as oxygen or nitrogen.

It has been discovered, according to the present invention, that both the discharge voltage and the space potential drop in such a sputtering apparatus of the coaxial cylinder type increases with an increase in the strength of said magnetic field above about 1000 gauss regardless of the distance between said pair of electrodes. It has also been discovered that a magnetic field higher than about 1000 gauss makes it possible for the sputtering apparatus shown in FIGS. 1 and 2 to operate efficiently at a pressure of said ionizable medium lower than $10^{-3}$ torr. It is preferable that said low pressure range from $10^{-3}$ to $10^{-5}$ torr. A high discharge voltage and this low working pressure together with a strong magnetic field, above 1000 gauss, causes the thin films to be deposited at a high rate of speed.

According to the present invention, the optimum sputtering rate is obtained by employing a magnetic field having a definite field strength together with a pair of electrodes having given dimensions and spaced a given distance from each other. The strength of said magnetic field varies with the type of ionizable medium used.

Figure 3:
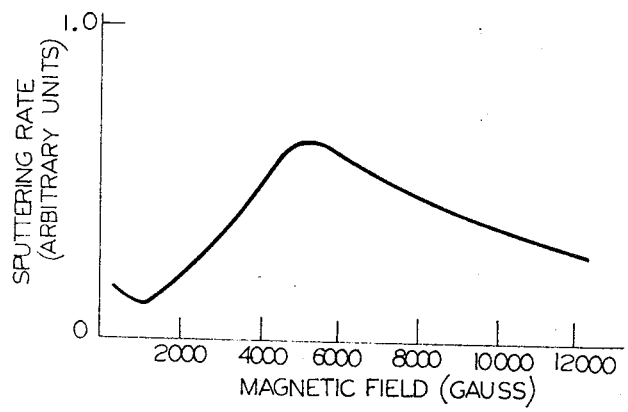
FIGS. 3, 4 and 5 are graphs illustrating the operating characteristics of the sputtering apparatus which is used in the method of producing thin films in accordance with the present invention.

For example, FIG. 3 shows the sputtering rate as a function of the strength of the magnetic field when the discharge is carried out by employing a sputtering apparatus as shown in FIGS. 1 and 2, under the following conditions:

TABLE 1

| Electrode | Material | Size |
| --- | --- | --- |
| Anode=Outer cylindrical electrode. | Copper | 60 mm. inside diameter, 20 mm. high. |
| Cathode=Inner cylindrical electrode. | ___do___ | 20 mm. outside diameter, 20mm high. |

Ionizable-Hydrogen of $10^{-4}$ Torr, medium. Discharge=10 ma. current.

It will be obvious after considering the disclosure of this invention that the sputtering rate, defined as the weight loss of the cathode per unit time, decreases with an increase in the strength of the magnetic field up to about 1000 gauss and increases with an increase in the strength of the magnetic field from 1000 gauss to about 5000 gauss. Over 5000 gauss, the sputtering rate again decreases with an increase in field strength.

We have also discovered that the films deposited on the substrates have a smooth surface when the magnetic field ranges from 1000 gauss to 9000 gauss under the conditions listed in Table 1.

It has been discovered according to this invention, as indicated by the above results, that thin films having a smooth surface can be deposited at a high rate of speed, by employing a magnetic field of between 1000 gauss and 9000 gauss. Thin films of smooth surface can be obtained at a higher deposition speed by employing a magnetic field of between 1000 and 5000 gauss in accordance with this invention. Therefore, the operable upper limit for the magnetic field is 9000 gauss and the optimum upper limit is 5000 gauss for the conditions listed in Table 1.

The operable upper limits and the optimum upper limits of the magnetic field strength for the various ionizable mediums, in accordance with the present invention, are listed in Table 2.

TABLE 2

| | Field strength | | |
| --- | --- | --- | --- |
| Ionizable medium | Operable upper limit (gauss) | Optimum upper limit (gauss) | Ion cut off field Bc (gauss) |
| Hydrogen | 9,000 | 5,000 | 4,800 |
| Nitrogen | 22,000 | 18,000 | 18,000 |
| Oxygen | 24,000 | 20,000 | 20,000 |
| Argon | 34,000 | 30,000 | 30,000 |

Referring to Table 2, it has been discovered that the optimum upper limit of the magnetic field corresponds to the ion cut-off field Bc of the ions in the ionizable medium in the sputtering apparatus, and that the operable upper limit of the magnetic field is the sum of the optimum value and 4000 gauss. Said ion cut-off field Bc is defined by the equation, $$Bc = (2MV/e)^{1/2} \frac{2r_2}{r_2^2 - r_1^2}$$

where M is the mass of the ions of the ionizable medium; e is the electronic charge; V is the discharge voltage across the electrodes, and $r_1$ and $r_2$ are the radii of the inner cylinder 2 and the outer cylinder 3, respectively, shown in FIGS. 1 and 2.

Therefore, it is seen that the optimum lower limit is 1000 gauss and that the optimum upper limit is the ion cut-off field and that the operable magnetic field is the sum of the ion cut-off field and 4000 gauss.

For a better understanding of the invention, the effects of said magnetic field on the sputtering mechanism will be described.

For a better understanding of the effects of said magnetic field on the sputtering mechanism, consider the effects of said magnetic field on the various modes of discharge.

We have found that there are critical differences between the mode of discharge when the magnetic field is below 1000 gauss and the mode of discharge when it is above 1000 gauss. The mode of discharge below 1000 gauss is characterized by the fact that the discharge voltage decreases with an increase in the magnetic field strength, whereas the mode of discharge above 1000 gauss is characterized by the fact that the discharge voltage increases with an increase in the magnetic field strength. Since the sputtering rate is proportional to the discharge voltage, when the magnetic field is below 1000 gauss, the sputtering rate decreases with an increase in the magnetic field strength. When said field is above 1000 gauss, the sputtering rate increases with an increase in the magnetic field.

Figure 4:
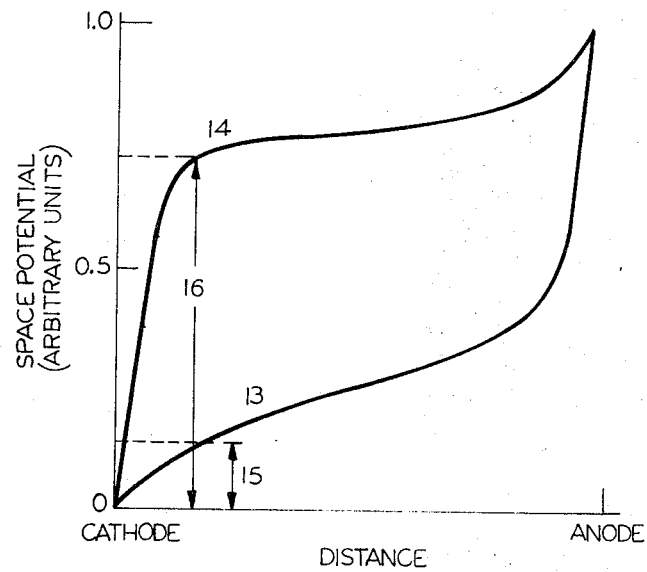

It is well known that the mode of discharge can be characterized by the space potential distribution in the discharge. FIG. 4 shows the typical space potential distribution for the sputtering system of FIGS. 1 and 2. Curve 13 shows the discharge when the magnetic field is about 500 gauss and curve 14 shows the discharge when the magnetic field is about 10,000 gauss. Both tests were made at a gas pressure of $10^{-3}$ torr of hydrogen.

Referring to FIG. 4, a remarkable cathode space potential drop 16 is observed in the curve 14 when the magnetic field is about 10,000 gauss.

Figure 5:
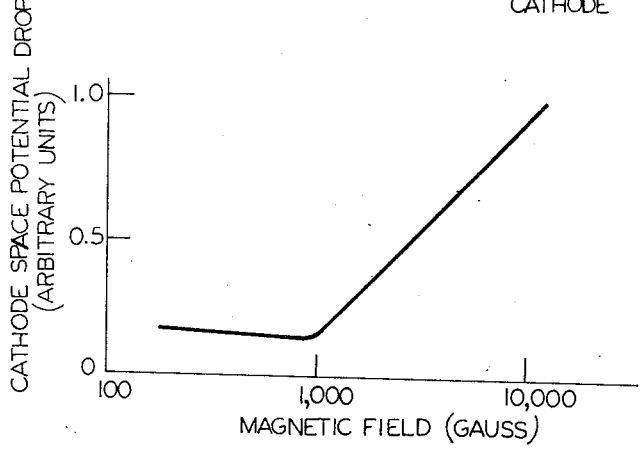

FIG. 5 shows the variation of the cathode space potential drops 15 and 16, defined by curves 13 and 14 in FIG. 4, as a function of the magnetic field strength.

Referring to FIG. 5, under a given discharge current and a given gas pressure, the cathod space potential drop increases with an increase in the magnetic field for a magnetic field above 1000 gauss. The cathode space potential drop also increases with a decrease in the gas pressure under a given discharge current and a given magnetic field, while below 1000 gauss the cathode space potential drop decreases with an increase in the magnetic field.

Those persons knowledgeable in the art will easily recognize that the mode of discharge in a magnetic field above 1000 gauss, as used in the sputtering process of the present invention, is quite different from the mode of discharge in a magnetic field below 1000 gauss, as was generally used in the prior art sputtering processes. One can also understand that this difference between the two modes is the critical difference between the operation of the sputtering apparatus of the present invention and that of the prior art sputtering apparatus.

A transition occurs between the two modes of discharge when the strength of the magnetic field exceeds a critical value under a given gas pressure and a given discharge current. Said critical value of the magnetic field increases with an increase in the gas pressure. When the gas pressure is between $10^{-3}$ and $10^{-5}$ mm. Hg, which is an appropriate value for the sputtering apparatus of the present invention, the critical value is about 1000 gauss.

The mechanism for sustaining the discharge of the novel discharge mode, according to this invention, is not fully understood. However, from a consideration of the principles of gaseous discharge, the reasons for the appearance of the novel mode are considered to be as follows: The motion of the electrons in the crossed electric and magnetic fields is described as a cycloidal motion. When the gas pressure is low the mean free path of the electrons is so large that the electrons which start from the cathode surface have no chance of colliding with neutral molecules during their movement through a cycloidal arc and as a result they return to the cathode surface where the electrons can be recaptured. Said recapture causes an extreme loss of the initially ejected electrons. To sustain the discharge at the given discharge current, the recapture of the initially ejected electrons at the cathode surface should be avoided.

Said recapture occurs when $a/\lambda \leq 1$, where $a$ is the length of an arc of a cycloid and $\lambda$ is the mean free path of the electron. The $a$ is expressed by $a = 8mE_K/eB^2$ and $\lambda = \lambda_0/p$ (in MKS units), where $E_K$ is the radial electric field near the cathode; $e$ and $m$ are the charge and mass of the electrons, respectively; B is the strength of the magnetic field in an axial direction; $\lambda_0$ is the mean free path at 1 torr; and $p$ is the gas pressure in torr. That is, the conditions for sustaining the discharge should be as follows:

$$a/\lambda = (8m/e\lambda_0)(E_K p/B^2) > 1$$

The above condition shows that when the pressure decreases or when the magnetic field increases, $E_K$ must increase. Thus, the cathode space potential drop increases with an increase in the magnetic field or with a decrease in the gas pressure as described above. The increase in the cathode space potential drop results in an increase in the discharge voltage across the electrodes. Thus in the sputtering apparatus of the present invention, which operates at a magnetic field above 1000 gauss, the discharge voltage increases with an increase in the magnetic field.

As described above, the maximum sputtering rate has been obtained in the ion cut-off field of the ionizable medium. The reason for this is considered to be as follows: During the discharge, under the influence of a strong magnetic field in a crossed field device like the one shown in FIGS. 1 and 2, most of the ions are generated in the steep voltage gradient near the anode. The gas pressure is so low that the mean free path of the ions is greater than the distance between the electrodes. Therefore, due to the effect of the magnetic field, ions move in a curved trajectory and impinge on the cathode, without colliding with any gas molecules. The increased magnetic field results in an increase in the curvature and simultaneously in an increase in the incident angle at the cathode. This results in a higher sputtering rate because the sputtering rate increases as the angle of incidence increases. The magnetic field at which the maximum sputtering rate is observed corresponds to the ion cut-off field where the incident angle is 90°.

Figure 6:
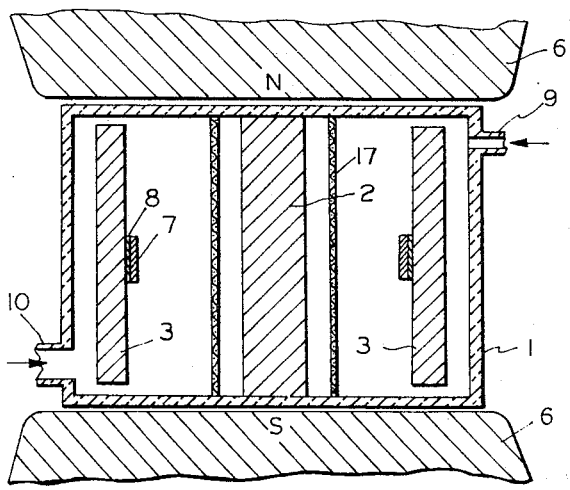
FIG. 6 is a diagrammatic, longitudinal, sectional view showing a modified form of the sputtering apparatus which is used in the method of producing thin films in accordance with the present invention.
Figure 7:
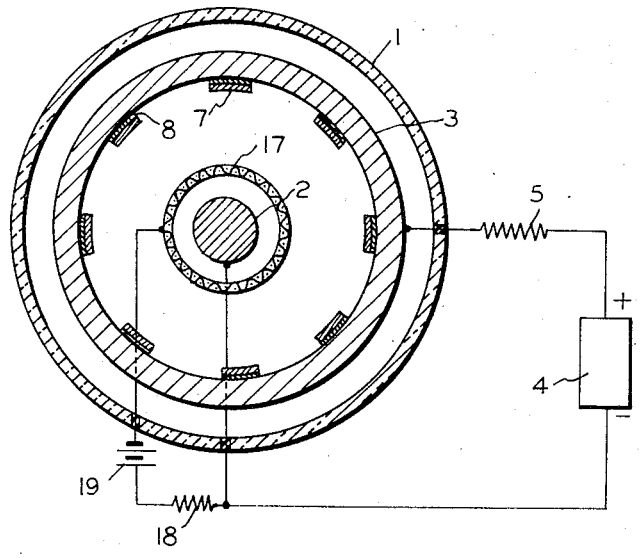
FIG. 7 is a cross sectional view of the modified sputtering apparatus of FIG. 6.

FIGS. 6 and 7 show diagrammatic views of a modified sputtering apparatus having a very stable operation in accordance with the present invention.

Referring to FIGS. 6 and 7, wherein reference characters 1 to 10 designate the same parts as similar characters in FIGS. 1 and 2, the modified sputtering apparatus has an auxiliary electrode 17. Said auxiliary electrode, comprising a cylindrical wire net or a cylinder having many holes, is preferably made of the same material as the cathode. Said auxiliary electrode is negatively biased by the voltage source 19 and is connected to a stabilizing resistor 18 which in turn is connected to the cathode 2.

Said auxiliary electrode can suppress the undesirable instability of the discharge in the sputtering apparatus, thus making it possible to produce a very thin, uniform film with good characteristics each time the process is carried out. The sputtered films do not have any pinholes. The optimum output voltage of the voltage source 19 is found to be from 0 to 200 volts regardless of the dimensions of the sputtering apparatus.

Although the sputtering apparatus is constructed in such a way that the inner electrode is the cathode, as shown in FIGS. 1 and 2, said sputtering apparatus can operate even when the outer electrode is used as the cathode.

Understanding the characteristics and operation of the discharge both in the prior art and in the present invention, one can better appreciate the detailed features of the novel method of producing thin films by using the sputtering apparatus as set forth below.

In the present method of producing thin films, the magnetic field higher than 1,000 gauss makes possible the use of a reduced working pressure of the ionizable medium. As a result, the thin films produced by the cathodic sputtering are freer from contamination caused by the residual gas. This is because the number of atoms of the gas impinging on the deposit is decreased during the formation of the film. Thus, the present method of producing thin films prevents the film produced by said sputtering operation from said contamination. Said contamination is one of the main drawbacks in the conventional method of producing thin films by using the conventional two electrode glow-discharge sputtering apparatus.

In the sputtering apparatus of the present invention, the energy of the impact of the ions which impinge on the cathode is nearly equal to the discharge voltage (75% of the discharge voltage). The discharge voltage at a given gas pressure and a given discharge current is governed by the relation; $V_s \propto B^n$, where $V_s$ is the discharge voltage, B is the strength of the magnetic field, and $n$ is a value between 0.3 and 0.5. Thus, the energy of the impact of the ions can be regulated by regulating the discharge voltage.

In the sputtering apparatus of this invention, the speed at which the films are deposited increases linearly with the input power ($V_s I_s$) supplied to the sputtering chamber at a given gas pressure. $I_s$ denotes the discharge current. Thus, the speed at which said thin films are deposited can be regulated, independent of the gas pressure or the discharge current, by regulating the discharge voltage which can be regulated by the magnetic field.

As set out above, in the sputtering apparatus of the present invention the three variables $V_s$, $I_s$ and gas pressure can be changed independently of each other by varying the strength of the magnetic field and the speed at which the thin films are deposited and the thickness of the films produced can be easily controlled accordingly. Moreover, the strong magnetic field suppresses the unwanted localized discharge from the localized area between the cathode and the anode. This results in the generation of a uniform discharge, which is necessary for the close control of the operation of said sputtering apparatus, and for the production of films which are superior in their homogeneity and which have a smooth surface. The films so produced adhere strongly to the substrates. Thus, the sputtering process of the present invention is free from the characteristics which make it difficult to control the manufacturing process. Said difficulty of control was the disadvantage of the conventional glow-discharge sputtering apparatus which was described above. The present method provides a thin film which can be relied upon for quality and uniformity.

In order that the features of this invention may be clearly understood, the method of producing thin films according to the present invention will be described below by means of examples.

In the method of producing thin films of the present invention by using a sputtering apparatus having a tantalum inner cylindrical cathode of 20 mm. in outside diameter, a tantalum outer cylindrical anode of 50 mm. in inside diameter and an atmosphere of argon gas at $1 \times 10^{-3}$ torr, the speed at which the thin film of tantalum is deposited on the substrate, positioned on the anode, is $1.2 \times 10^{-2}$ $V_s I_s$ (angstrom/min), where the discharge voltage $V_s$ is in volts and the discharge current $I_s$ is in milliamperes. For a titanium cathode, the thin films of titanium are produced at a deposition speed of $1.0 \times 10^{-2}$ $V_s I_s$ (angstrom/min). The thin films produced are applicable as a conductor for use in thin film, microelectronic circuits.

When the sputtering process is carried out in an atmosphere consisting of a mixture of oxygen and argon gases, the cathode materials are reactively sputtered and oxide metal films are deposited on the substrate. For example, when the cathode material is titanium, tantalum, aluminum, niobium or copper, the films produced are titanium oxide, tatalum oxide, aluminum oxide, niobium oxide or copper oxide, respectively. If the ratio of the oxygen pressure to the argon pressure is chosen so as to be a small value, the films produced have semiconductive properties and can be used for thin film resistors. For example, the present method can produce a semiconductive thin film when the ratio is less than 0.02 by using a sputtering apparatus having a titanium cathode. At a ratio of 0.01 thin films having a resistivity of 4.5000 $\mu\Omega$/cm. are produced at a deposition speed of $0.5 \times 10^{-2}$ $V_s I_s$ (angstrom/min.).

If the ratio of the oxygen pressure to the argon pressure is chosen so as to be a large value, the films produced have insulating properties. For example, by using a sputtering apparatus having a titanium cathode, the present method can produce titanium dioxide films having insulating properties at a deposition speed of $0.25 \times 10^{-2}$ $V_s I_s$ when the ratio is more than 0.05. Tantalum oxide films having insulating properties can be produced when the cathode is tantalum and the ratio is more than 5.

The films of the metal oxide having insulating properties produced by the method of the present invention can be used for coating thin film, micro-electronic circuits or for producing thin film transistors.

When the metal oxide is deposited onto metal films, a metal oxide/metal system can easily be formed. The system is applicable to the production of thin film, microelectronic circuit elements such as thin film capacitors and thin film rectifiers.

For example, when titanium dioxide films are deposited onto titanium films, $TiO_2$/Ti systems are formed. The evaporation of gold onto the $TiO_2$ film, as a counter electrode, yields an Au/$TiO_2$/Ti system which can be used as a thin film capacitor, a thin film rectifier or a thin film negative resistor, the various elements being produced by varying the ratio of the oxygen pressure to the argon pressure in the manufacturing process of the $TiO_2$. For the purpose of producing a thin film, non polar capacitor in the Au/$TiO_2$/Ti system, the ratio of the oxygen pressure to the argon pressure is from 0.1 to 1. For the purpose of producing a thin film rectifier in the Au/$TiO_2$/Ti system, the ratio is from 0.005 to 0.05 or more than 5.

According to this invention, a metal oxide/metal system, consisting of any species of materials, can easily be achieved in a manner similar to that described for the formation of the titanium dioxide/titanium system. That is to say, there can be formed systems of: tantalum oxide/tantalum, hafnium oxide/hafnium, zirconium oxide/zirconium, niobium oxide/niobium, and aluminum oxide/aluminum. The species of counter electrodes is not limited to gold. The material of the counter electrode is taken from the group consisting of conductive materials such as Au, Cu, Al, Ni, Cr, Pd, Ta, Ti, Hf, Zr, Nb, W, or from alloys such as Ni-Cr, or alloys of resistive materials such as titanium oxide, tantalum oxide or tantalum nitride. The system of metal oxide/metal, wherein the resistive material is used for the counter electrode, can be used to produce a thin film hybrid network of capacitors, rectifiers and resistors which are useful in thin film, micro-electronic circuits.

The ionizable medium is not limited to argon and oxygen. In order to produce pure metal films, the ionizable medium should be taken from the group consisting of inert gases such as: A, Ne, Kr, Xe or a mixture thereof. In order to produce compound metal films, the ionizable medium should be taken from the group consisting of reactive gases, such as $O_2$, $N_2$, $H_2$, sulfur or a mixture of the above inert gas and said reactive gas.

As set out above, the method of producing thin films according to the present invention is useful for producing microelectronic circuits. Moreover, the thin films produced according to this invention can be used not only for the production of micro-electronic circuits, but also for the coating of a body. The thin films consisting of an alloy can be produced by employing a cathode made of said alloy.

It is thought that the invention and its advantages will be understood from the foregoing description.

What is claimed:

1. In a method of producing thin films by a cathodic sputtering process in a sputtering apparatus of the coaxial cylinder type having a pair of cylindrical electrodes enclosed in a gas tight envelope and consisting of an outer cylindrical electrode and an inner cylindrical electrode surrounded at least partially by said outer cylindrical electrode, one of said pair of cylindrical electrodes being a cathode provided with a smooth surface layer of depository material and the outer of said pair of cylindrical electrodes being an anode adapted for having substrates secured to it, the method comprising applying a voltage across said pair of cylindrical electrodes for forming a discharge between said pair of cylindrical electrodes and establishing a magnetic field parallel to the sides of said cylindrical electrodes and transverse to the discharge of said electrodes, that improvement consisting of making said magnetic field higher than 1,000 gauss.

2. The improvement in producing a thin film by a cathodic sputtering process as claimed in claim 1, wherein said magnetic field ranges from 1,000 gauss to a value which is the sum of an ion cut-off field Bc and 4,000 gauss.

3. The improvement in producing a thin film by a cathodic sputtering process as claimed in claim 1, wherein said magnetic field ranges from 1,000 gauss to an ion cut-off field Bc.

4. In a method of producing thin films by a cathodic sputtering process in a sputtering apparatus of the coaxial cylinder type having a pair of cylindrical electrodes enclosed in a gas tight envelope and consisting of an outer cylindrical electrode and an inner cylindrical electrode surrounded at least partially by said outer cylindrical electrode and one of said pair of cylindrical electrodes being a cathode provided with a smooth surface layer of depository material and the other of said pair of cylindrical electrodes being an anode adapted for having substrates secured to it, and a cylindrical auxiliary electrode arranged between said pair of cylindrical electrodes and being coaxial therewith and positioned near said cathode electrode, the method comprising applying a voltage across said pair of cylindrical electrodes for forming a discharge between said pair of cylindrical electrodes, negatively biasing said auxiliary electrode, and establishing a magnetic field parallel to the sides of said cylindrical electrodes and transverse to the discharge of said electrodes, that improvement consisting of making said magnetic field higher than 1,000 gauss.

5. The improvement in producing a thin film by a cathodic sputtering process as claimed in claim 4, wherein said magnetic field ranges from 1,000 gauss to a value which is the sum of an ion cut-off field Bc and 4,000 gauss.

6. The improvement in producing a thin film by a cathodic sputtering process as claimed in claim 4, wherein said magnetic field ranges from 1,000 gauss to an ion cut-off field Bc.

References Cited

UNITED STATES PATENTS 2,146,025   2/1939   Penning _____ 204—192
3,361,659   1/1968   Bertelsen _____ 204—192

OTHER REFERENCES

E. Kay: J. of App. Physics, vol. 34, No. 4 (part 1), pp. 760–8, April 1963.

ROBERT K. MIHALEK, Primary Examiner

U.S. Cl. X.R.
204—298